United States Patent [19]
Long

[11] 3,943,376
[45] Mar. 9, 1976

[54] OCCUPANCY DETECTOR APPARATUS FOR AUTOMOTIVE SAFETY SYSTEMS

[75] Inventor: David K. Long, Sunnyvale, Calif.

[73] Assignee: Fairchild Camera and Instrument Corporation, Mountain View, Calif.

[22] Filed: Jan. 27, 1975

[21] Appl. No.: 544,444

Related U.S. Application Data

[62] Division of Ser. No. 408,681, Oct. 23, 1973, Pat. No. 3,898,472.

[52] U.S. Cl. .............................................. 307/116
[51] Int. Cl.² ....................................... B62D 45/00
[58] Field of Search ............ 307/116, 105 B, 10 R; 340/52 E, 258 C, 278; 317/DIG. 2

[56] References Cited
UNITED STATES PATENTS 3,751,674  3/1972  Holt ................................ 340/278 X
3,864,668  2/1975  Bickford ....................... 340/278 UX Primary Examiner—Herman Hohauser
Attorney, Agent, or Firm—Alan H. MacPherson; J. Ronald Richbourg; Henry K. Woodward

[57] ABSTRACT

Occupancy detector apparatus including a metallic electrode disposed to cooperate with the body of an automobile to form an occupant sensing capacitor, a reference capacitor, and an IC capacitance detecting and logic generating circuit. The IC includes a current source for continuously supplying charging current to the sensing capacitor and the reference capacitor, a first charge detecting circuit for detecting the charge on the sensing capacitor, a second charge detecting circuit for detecting the charge on the reference capacitor, and a comparator circuit for comparing the output signals developed by the first and second charge detecting circuits and for developing a logic output commensurate with the relationship between the capacitances of the sensing capacitor and the reference capacitor.

5 Claims, 5 Drawing Figures

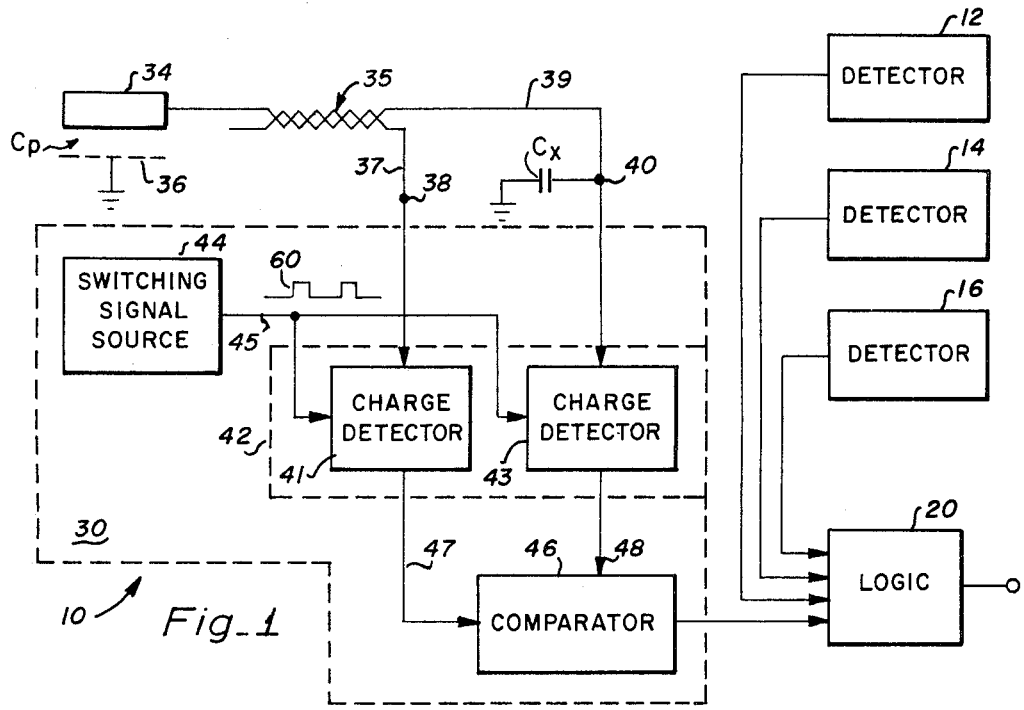
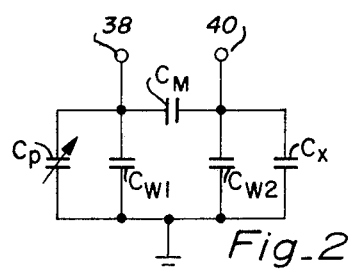
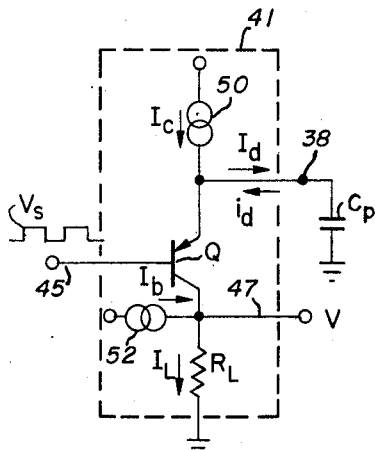
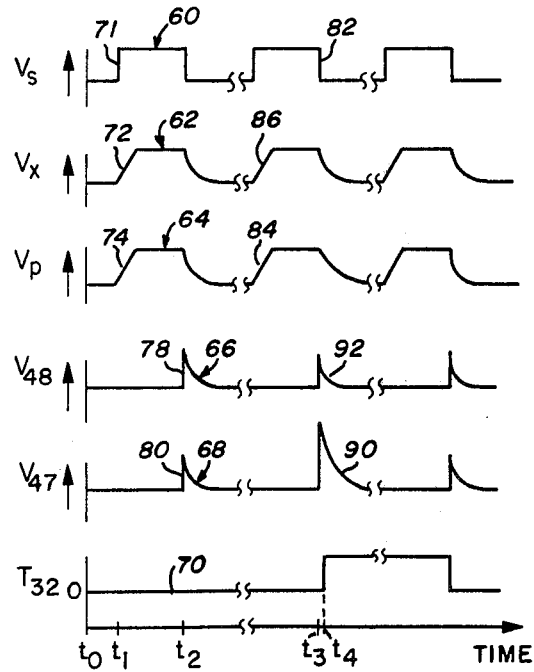

3,943,376

OCCUPANCY DETECTOR APPARATUS FOR AUTOMOTIVE SAFETY SYSTEMS

This is a division of application Ser. No. 408,681, filed Oct. 23, 1973, now U.S. Pat. No. 3,898,472, issued Aug. 5, 1975.

BACKGROUND OF THE INVENTION

1. Field of the invention

The present invention relates generally to automotive safety systems and more particularly to a capacitive occupancy detection apparatus for sensing the presence of a driver or passenger in a particular seat of an automobile and developing electronic logic when can be used in an automotive safety system.

2. Discussion of the Prior Art

For the past several years substantial legislative activity has concerned itself with requiring not only installation but enforced use of safety equipment in private automobiles. The first legislation enacted dealt simply with the required provision of safety equipment such as seat belts. This legislation was followed by subsequent laws requiring the provision of alarm devices to encourage use of the seat belts and subsequent standards now require that certain interlocking systems be provided in new model automobiles which prohibit operation of the automobile if the seat belt is not used. In order to assure that the seat belts are in fact used, the latest standards even require that a certain sequence of events occur before the engine may be started. This latter requirement serves a dual purpose of preventing operation of the vehicle unless the seat-belts are used, while at the same time making it more difficult for one temporarily incapacitated due to a state of inebriation, or the like, to operate the vehicle.

One of the problems encountered in implementing such requirements has been the lack of availability of suitable detecting apparatus capable of accurately detecting the presence of an occupant in a particular vehicle seat. Early detection apparatus utilized one or more mechanical switches which were actuated by body weight upon the seat. However, that type of detector has been found to be generally inadequate since its operation depends upon such variables as the structural characteristics of the seat materials, the temperature characteristics of the seat materials, the location of the switch relative to the seat structure itself, and the position and weight of a seat occupant.

SUMMARY OF THE PRESENT INVENTION

It is therefore a principal objective of the present invention to provide an occupant detection apparatus which avoids the use of mechanical sensing devices, and which includes electronic detection components that can be produced in integrated circuit form.

Briefly, the present invention includes a metallic electrode which is disposed to cooperate with the body of an automobile to form an occupant sensing capacitor, a reference capacitor, and an integrated circuit capacitance detecting and logic generating circuit. The integrated circuit includes a current source for continuously supplying charging current to the sensing capacitor and the reference capacitor, a first charge detecting circuit for detecting the charge on the sensing capacitor, a second charge detecting circuit for detecting the charge on the reference capacitor, and a comparator circuit for comparing the output signals developed by the first and second charge detecting circuits and for developing a logic output commensurate with the relationship of the capacitances of the sensing capacitor and the reference capacitor.

The several advantages of the present invention will no doubt become apparent to those of ordinary skill in the art after having read the following detailed description of a preferred embodiment illustrated in the several figures in the drawing.

FIG. 1 is a block diagram generally illustrating occupant detection apparatus in accordance with the present invention;

FIG. 2 is an equivalent circuit diagram representative of the detector probe apparatus shown in FIG. 1;

FIG. 3 is a schematic representation of a circuit illustrating a preferred embodiment of the charge detectors illustrated in FIG. 1;

FIG. 4 is a timing diagram illustrating operation of the embodiment of the present invention shown in FIG. 1, and, FIG. 5 is a schematic representation of the occupant detection apparatus in accordance with the present invention.

DETAILED DESCRIPTION OF THE PREFERRED EMBODIMENT

Figure 5:
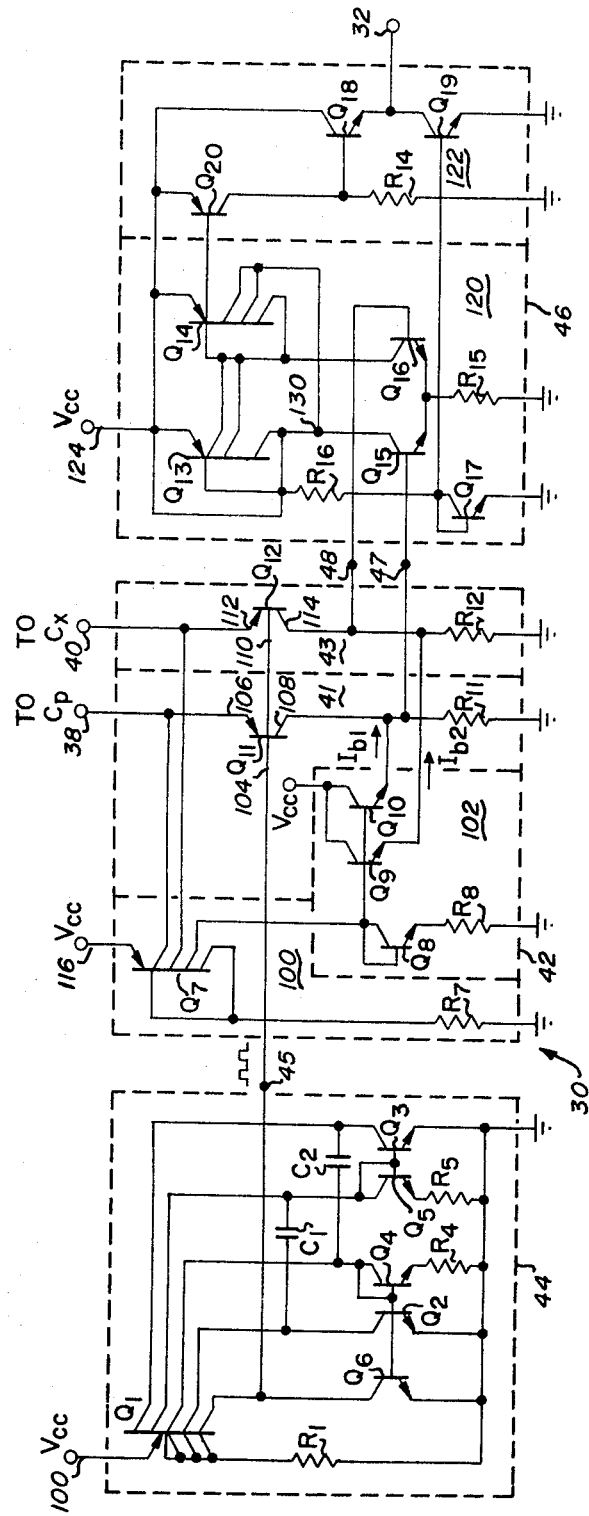

Referring now to FIG. 1 of the drawing, a simplified block diagram is shown generally illustrating an automotive safety system including an occupant detection apparatus 10 in accordance with the present invention. The system includes an occupant detection apparatus 10 for each seat to be monitored, other detectors 12, 14, 16 . . . which might for example sense auto ignition status detector, seatbelt lock/unlock detector, gear shift position detector, etc., and logic circuitry 20 which responds to the outputs developed by the several detectors to either enable or disable the operation of the vehicle. The occupant detection 10 apparatus includes means forming an occupant responsive probe capacitor $C_p$, a reference or balancing capacitor $C_x$, and capacitive detecting and comparing circuit means 30 for comparing the capacitances of capacitors $C_P$ and $C_x$, and developing an appropriate logic signal at its output terminal 32.

In the preferred embodiment, the probe capacitor $C_P$ is comprised of a metallic plate 34 which is placed beneath the seat to be monitored and forms one plate of the capacitor. The other plate of the capacitor $C_p$ is formed by the auto body and is represented by the dashed line 36. Plate 34 may alternatively be formed of a wire grid, a section of metallic fabric forming a portion of the seat to be monitored or other suitable means. The reference capacitor $C_x$ is comprised of a simple fixed capacitor which may be placed close to plate 34 or within the circuit means 30 and is chosen to have a predetermined capacitance relative to that of capacitor $C_p$ when the seat is unoccupied.

Probe capacitor $C_p$ and reference capacitor $C_x$ are respectively coupled to a pair of terminals 38 and 40 by means of suitable conductors 37 and 39 which are preferably of equal length and twisted as indicated at 35 to reduce as much as possible the introduction of spurious signals. In the preferred embodiment, strips of twinflex cabling were found quite adequate.

Circuit means 30 includes an electric charge detecting means 42, a switching signal source 44 and a comparator circuit 46. In the preferred embodiment source 44 is a multivibrator circuit capable of generating a train of switching pulses as indicated at 60. Charge detecting means 42 includes a pair of detector circuits 41 and 43 having first input leads connected to terminals 38 and 40 respectively, and second input leads connected to the output lead 45 of switching source 44. Charge detector circuit 41 is responsive to the capacitance of probe capacitor $C_p$ and periodically develops a signal corresponding thereto on line 47 when actuated by the pulses generated by switching source 44. The second charge detector circuit 43 is responsive to the capacitance of reference capacitor $C_r$ and when actuated by source 44 develops a signal corresponding thereto on line 48. The signals developed on lines 47 and 48 are compared by comparator circuit 46 when in turn develops a responsive logic signal on output line 32. In accordance with the present invention, the logic signals developed on line 32 have a logic 0 state when the seat is unoccupied and a logic 1 state when the seat is occupied.

In addition to the capacitance of probe capacitor $C_p$ and the capacitance of reference capacitor $C_r$, as shown schematically in FIG. 2 there will also exist a small lead-to-body capacitance $C_{w1}$ due to the lead line 37 and a small lead-to-body capacitance $C_{w2}$ due to the lead line 39. There will also be a small mutual capacitance $C_m$ existing between the lead lines 37 and 39. However, as will be explained below, since the capacitors $C_p$ and $C_r$ will be charged to the same potential, the capacitance $C_m$ will not conduct any current, so it may be neglected, and any differences in the capacitances $C_{w1}$ and $C_{w2}$ can easily be balanced out by adjustment of the reference capacitor $C_r$.

Turning now to FIG. 3 of the drawing, a simplified schematic of the charge detector 41 is shown to illustrate the functional operation of this portion of the device. This portion of the device includes a current source 50, a switching transistor Q, a second current source 52 and a load resistor $R_L$. Current source 50 develops a constant current $I_c$ for application to output terminal 38 to continuously supply charging current to the probe capacitance $C_p$. Switching transistor Q is a PNP transistor which responds to a switching signal applied to terminal 45 to discharge capacitor $C_p$ through resistor $R_L$. The second current source 52 supplies a bias current $I_b$ to the load resistor $R_L$ to maintain a predetermined quiescent potential at terminal 47. When the voltage applied to terminal 45 is more positive than that applied to the emitter of transistor Q, the transistor will be non-conductive, thereby permitting $I_c$ to flow into capacitor $C_p$ causing it to charge. At the same time current $I_b$ flows through load resistor $R_L$ developing a quiescent output potential between terminal 47 and circuit ground.

When the switching potential goes negative and pulls the base of transistor Q more negative than its emitter, the transistor will conduct and cause capacitor $C_p$ to discharge through resistor $R_L$. The resulting discharge current $i_d$ adds to the bias current $I_b$ to develop a spike in the load current $I_L$, and thus a spike in the output voltage V developed across load resistor $R_L$. Since the transient discharge current $i_d$ during the discharge cycle may be expressed as $$i_d = -\frac{E_{cp}}{R_L}e^{-(1/R_L C_p)t}$$

where $E_{cp}$ is the charged voltage of capacitor $C_p$ and $t$ is the time following the turn-on of transistor Q, the amplitude of the spike in the voltage V developed at output terminal 47 will be proportional to the charge stored on capacitor $C_p$ and indicative of the capacitance of capacitor $C_p$. In other words, since the magnitude of $i_d$ for any instant of time is related to the capacitance of capacitor $C_p$ and the capacitance of $C_p$ is proportional to the dielectric constant of its dielectric, a simple change in the dielectric will be reflected in the voltage V. The dielectric constant for a volume of space between a pair of capacitor plates i.e., the plate 34 and automotive body 36 forming $C_p$, including a human body has a higher value than the same space in the absence of the human body. Accordingly, during the discharge cycle $i_d$ and thus V will increase when the seat corresponding to capacitor $C_p$ is occupied no matter how large or small the occupying body, and will be relatively independent of the temperature and actual body loading applied to the seat per se.

If charge detectors 41 and 47 in the embodiment of FIG. 1 are designed to duplicate the function illustrated by the schematic of FIG. 3, the operation of the detection apparatus 10 can be explained by referring to the timing diagram shown in FIG. 4. In FIG. 4, curve 60 illustrates the train of switching pulses $V_s$ generated by signal source 44 at its output 45; curve 62 represents the voltage $v_r$ developed across reference capacitor $C_r$ for any instant of time; and curve 64 represents the voltage $v_p$ developed across the probe capacitor $C_p$ for any particular instant of time. Curve 66 represents the voltage $V_{48}$ developed by detector 43 at its output 48; curve 68 represents the voltage $V_{47}$ developed by detector 41 at its output 47 and curve 70 illustrates the logical output $T_{32}$ developed by comparator 46 at its output terminal 32.

In operation, with the seat corresponding to capacitor $C_p$ unoccupied, capacitor $C_r$ selected to have a predetermined relationship to the capacitor $C_p$ during the unoccupied seat condition, and $V_s$ driving transistor Q conductive, the capacitors $C_p$ and $C_r$ will be discharged and the charging currents $I_c$ and the biasing currents $I_b$ will flow through the load resistors $R_L$ of each detector to develop output voltages $v_{47}$ and $V_{48}$ respectively. Voltages $v_{47}$ and $V_{48}$ are initially at some quiescent values that, when sampled by comparator 46, causes the comparator to develop a logic 0 output at terminal 32 indicating there is no occupant in the seat. As the first switching pulse 71 occurs at time $t_1$, the transistors Q in detectors 41 and 43 will be simultaneously biased nonconductive allowing capacitors $C_p$ and $C_r$ to be charged by the currents $I_c$, as illustrated by the sloped lines 72 and 74 of curves 62 and 64. The respective capacitors will then be charged to a voltage determined by the base-to-emitter characteristics of the transistors Q.

When the switching pulse 71 terminates at a subsequent time $t_2$, the transistors Q will be driven conductive allowing the capacitors $C_p$ and $C_r$ to discharge through the load resistors $R_L$ developing transitory voltage spikes 78 and 80 due to the discharge currents $i_d$. If the capacitances of capacitors $C_p$ and $C_r$ are equal, the discharge currents $i_d$ will also be equal and comparator 52 will not detect a difference between its two inputs and accordingly, its output $T_{32}$ will remain in the zero logic state as indicated at 70. If, however, at some later time, the seat is occupied, the capacitance of capacitor $C_p$ will increase, and upon the occurence of the next switching pulse 82, capacitor $C_p$ will charge to a higher level than capacitor $C_r$. Thus, at time $t_3$, as the trailing edge of pulse 82 occurs and the transistors Q are again driven conductive, capacitors $C_p$ and $C_x$ will discharge through their respective load resistors causing voltage spike 90 and 92 to be developed. Since the charge q stored on capacitor $C_p$ is larger than the charge stored on $C_x$ and since $$i_d = dq/dt$$

the resultant discharge currents $i_d$ and corresponding output voltages V will be unequal.

Accordingly, during the following discharge period, the amplitude of the voltage spike 90 developed on line 47 will exceed the amplitude of the spike 92 developed on line 48. Comparator 46 will detect the difference in amplitudes of the spikes and switch the state of its output $T_{82}$ to a logic 1. $T_{32}$ will remain in the logic 1 state so long as the voltage differences between subsequent spikes exceed some predetermined threshold. The logic 1 output of course indicates the presence of an occupant in the seat.

If at some later time, the occupant exits the car or moves to another seat, the capacitance of capacitor $C_p$ will decrease, the detected voltage across the corresponding load resistor will return to its non-occupied value, and the output $T_{32}$ developed at terminal 32 will change to the logic 0 state. It will thus be appreciated that since occupant detection is determined on the basis of a change in the dielectric of a capacitor, detection is completely independent of weight-load applied to the seat; is independent of ambient temperature since both capacitor $C_p$ and capacitor $C_x$ are equally affected by any change in ambient temperature; and is independent of any of the mechanical characteristics of the seat materials.

In FIG. 5 of the drawing, an integrated circuit embodiment of the detecting and comparing means 30 shown generally in FIG. 1 is illustrated, with like numerals corresponding to like parts in both figures. Signal source 44 may be described as a flipflop multivibrator essentially comprised of a multi-collector, current source transistor $Q_1$ and a plurality of bipolar transistors $Q_2$–$Q_6$. The PNP transistor $Q_1$ has three of its collectors connected to its base and to circuit ground through resistor $R_1$. Each of the other five collectors of transistor $Q_1$ is connected to the collector of one of the NPN transistors $Q_2$–$Q_6$ and serves as a current source for that particular transistor. Transistors $Q_2$ and $Q_3$ are connected as common emitter amplifier stages with regenerative feedback capacitively coupled from the collector of each transistor to the base of the other transistor by means of the capacitors $C_1$ and $C_2$. The diode connected transistors $Q_4$ and $Q_5$ stabilize the loop gain which is set by the resistors $R_4$ and $R_5$. Transistor $Q_6$ is an output transistor having its base in common with transistor $Q_2$ and therefore follows the operation of $Q_2$.

When power is initially applied to the circuit at terminal 100, current flowing through the resistor $R_1$ biases transistor $Q_1$ conductive, causing current to flow through the various collectors of $Q_1$ into the collectors of transistors $Q_2$–$Q_6$. Initially, the same amount of current tends to flow through $Q_2$ and $Q_3$. However, since a perfect balance between the two currents is unlikely, if the current through transistor $Q_2$ for example, should increase without an attendant increase in that through transistor $Q_3$, the multivibrator will tend to oscillate.

As the current through transistor $Q_2$ increases, the resultant decrease in collector voltage is immediately coupled to the base of transistor $Q_3$ by the discharge of capacitor $C_1$ through diode $Q_5$ and resistor $R_5$. This negative voltage at the base of transistor $Q_3$ reduces the current through $Q_3$, and its collector voltage rises. The charge of capacitor $C_2$ through resistor $R_4$ and diode $Q_4$ couples the increase in voltage at the collector of transistor $Q_3$ to the base of transistor $Q_2$ and further increases the flow of current through $Q_2$ causing the collector voltage of $Q_2$ to decrease even more and the base of $Q_3$ to be driven more negative.

As a result of this regenerative action, transistor $Q_2$ is driven into saturation almost instantaneously and just as quickly transistor $Q_3$ is cut off. This condition is maintained as long as the charge current of capacitor $C_2$ develops sufficient voltage across $R_4$ to hold $Q_2$ on. The collector current of $Q_1$, and capacitance of $C_2$ therefore determine the time that $Q_3$ remains cut off and $Q_2$ remains ON, i.e., the duration of the negative half cycle of the squarewave output since output transistor $Q_6$ follows $Q_2$. During this period, the voltage at the output terminal 45 is the collector saturation potential of transistor $Q_6$.

Charge current from $C_2$ remains constant until the associated collector of $Q_1$ goes into saturation, then the current becomes so small that the voltage developed across $R_4$ is insufficient to hold $Q_2$ ON. The increase in collector voltage that results when $Q_2$ goes off is coupled by $C_1$ and $R_5$ to the base of $Q_3$. Current flow through $Q_3$ then increases and the collector voltage of this transistor falls. $Q_6$ of course follows $Q_2$. The negative swing of the voltage at the collector of $Q_3$ is coupled by $C_2$ and $R_4$ to the base of $Q_2$ to increase further the cutoff of $Q_3$.

The regenerative action of the multivibrator then quickly drives $Q_3$ to saturation and $Q_2$ to cutoff with the length of time that this condition is maintained being determined by the time constant of $C_2$ and $R_1$. During this period, which represents the positive half cycle of the squarewave output, the voltage at the output terminal is substantially equal to the DC supply voltage $V_{cc}$.

Turning now to the charge detecting means outlined at 42, it will be noted that this section of the circuit is comprised of a current source 100, a bias network 102, and the charge detector circuits 41 and 43. The current source 100 includes a multi-collector PNP transistor $Q_7$ having its base and one collector coupled to circuit ground through resistor $R_7$ to maintain conduction at a fixed level. Current flowing through the remaining three collectors is fed to the emitters of PNP transistors $Q_{11}$ and $Q_{12}$ and to the collector of $Q_8$.

Bias network 102 is comprised of the diode connected transistor $Q_8$, a resistor $R_8$ and a pair of NPN transistors $Q_9$ and $Q_{10}$. Diode $Q_8$ and resistor $R_8$, in combination with the constant current provided by $Q_7$ provide turn-on potentials for $Q_9$ and $Q_{10}$ which develop constant biasing currents $I_{b1}$ and $I_{b2}$ at their respective emitters.

Charge detector 41 is comprised of a switching PNP transistor $Q_{11}$ which has its base 104 connected to switching source terminal 45, its emitter 106 connected to one of the collectors of current source $Q_7$ and to capacitor $C_p$ through terminal 38, and its collector 108 connected to ground through resistor $R_{11}$. Note that the collector of $Q_{11}$ is also coupled to the emitter of $Q_{10}$ and to the detector output terminal 47. Similarly, detector 43 includes a PNP transistor $Q_{12}$ having its base 110 coupled to signal source terminal 45, its emitter 112 coupled to the reference capacitor $C_r$ through terminal 40, and to one of the collectors of current source $Q_7$, and its collector 114 coupled to circuit ground through a resistor $R_{12}$. Collector 114 is also connected to the emitter of $Q_9$ and the detector output terminal 48.

In operation, with the emitter of $Q_7$ coupled to $V_{cc}$ at terminal 116, current flowing through the biasing resistor $R_7$ causes $Q_7$ to provide equal currents to the biasing diode $Q_8$ and the emitters 106 of $Q_{11}$ and 112 of $Q_{12}$. The biasing circuit 102 is thereby caused to supply continuous biasing currents $I_{b1}$ and $I_{b2}$ through resistors $R_{11}$ and $R_{12}$ respectively, which in turn cause equal quiescent potentials to be developed at terminals 47 and 48 respectively. During the time that the switching signal at input terminal 45 is in its positive half cycle, the positive potentials at bases 104 and 110 cause transistors $Q_{11}$ and $Q_{12}$ to be reverse biased thus non-conducting. Current will thus flow from current source $Q_7$ into capacitors $C_p$ and $C_r$ through terminals 38 and 40 causing them to become charged.

During the negative going half-cycle of signal source 44, transistors $Q_{11}$ and $Q_{12}$ are forward biased and operative to discharge capacitor $C_p$ through $R_{11}$ and to discharge resistor $C_r$ through $R_{12}$ thereby developing voltage spikes on the quiescent potentials continuously appearing at terminals 47 and 48. The relative amplitudes of these spikes will of course be determined by the relative capacitances of capacitors $C_p$ and $C_r$ as explained previously.

The comparator and logic generating circuit enclosed within the dashed lines 46 includes a bistable multivibrator or flip-flop 120 and an output circuit 122. Flip-flop 120 is comprised of a pair of multi-collector PNP transistors $Q_{13}$ and $Q_{14}$, a PNP transistor $Q_{20}$, three NPN transistors $Q_{15}$, $Q_{16}$ and $Q_{17}$ and resistances $R_{15}$ and $R_{16}$. The base and one of the collectors of $Q_{13}$ are coupled together and to the collector of transistor $Q_{15}$. The other two collectors of $Q_{13}$ are coupled to the base of $Q_{14}$ and to the collector of $Q_{16}$. Transistor $Q_{17}$ is diode connected to bias transistor $Q_{19}$ to a current dependent on $V_{cc}$ and $R_{16}$.

The base and one of the collectors of $Q_{14}$ are connected to the collector of transistor $Q_{16}$. The other two collectors of $Q_{14}$ are connected to the collector of transistor $Q_{15}$. The base of $Q_{14}$ is connected to the base $Q_{20}$. The collector of $Q_{20}$ is connected through the resistor $R_{14}$ to circuit ground. The emitters of $Q_{13}$, $Q_{14}$ and $Q_{20}$ are connected to $V_{cc}$ at terminal 124. The base of transistor $Q_{15}$ is coupled to terminal 47 and the base of $Q_{16}$ is coupled to terminal 48. The emitters of both $Q_{15}$ and $Q_{16}$ are coupled through resistor $R_{15}$ to ground.

Output circuit 122 is comprised of the resistor $R_{14}$ and a pair of NPN transistors $Q_{18}$ and $Q_{19}$. The base of transistor $Q_{18}$ is connected to the top side of resistor $R_{14}$ while its collector is connected to $V_{cc}$ and its emitter is connected to output terminal 32. The base of transistor $Q_{19}$ is connected to the collector of $Q_{17}$ while its collector is connected to output terminal 32 and its emitter is connected to circuit ground.

In operation, with the collector current in $Q_{16}$ equal to the collector current in $Q_{15}$, a portion of the $Q_{16}$ collector current will flow in the commonly connected collector and base of $Q_{14}$. Twice this current will pass from the two other collectors of $Q_{14}$ into the node 130 at the collector of $Q_{15}$. This will reduce the current flowing from the collector of $Q_{15}$ into the base and one collector of $Q_{13}$. The current sourced by the other two collectors of $Q_{13}$ will be reduced by twice this amount and thereby permit more of the current from $Q_{16}$ to pass into the collector and base of $Q_{14}$. The net result of this regenerative action is that $Q_{14}$ draws the collector current of both $Q_{15}$ and $Q_{16}$, and $Q_{13}$ is turned off. $Q_{20}$ follows $Q_{14}$ and turns on the output transistor $Q_{18}$ so as to raise the output voltage at terminal 32.

If now the voltage at the base of $Q_{15}$ is higher than that at the base of $Q_{16}$ such that the collector current of $Q_{15}$ is twice that of $Q_{16}$, there will be insufficient bias on $Q_{14}$ to draw all of the current of $Q_{15}$. Consequently, $Q_{13}$ will become conductive and by a similar regenerative action $Q_{14}$ will turn off so that $Q_{13}$ carries all of the current of $Q_{15}$ and $Q_{16}$. The output 32 will then go low. Thus this flip-flop requires sufficient differential input voltage between 47 and 48 to cause a 2:1 ratio of collector currents in $Q_{15}$ and $Q_{16}$ before it will change state. At normal operating temperatures this voltage is approximately ±20mV.

In the above described embodiment of the present invention, the entire circuit illustrated in FIG. 5 could be integrated on a single chip requiring only voltage supply, ground and output connection terminals. It will of course be appreciated however, that a similar circuit could be provided using any suitable combination of integrated and discrete components. Also, it will be appreciated that other oscillator circuits or other comparator circuits could just as well be substituted for those illustrated in FIG. 5.

It will further be appreciated that the present invention will have utility in application outside those of automotive safety. For example, a similar capacitive detection apparatus could be used as an anti-intrusion alarm triggering means for use in homes, offices and warehouses. Furthermore, the detection apparatus could be used in automobiles, airplanes and other vehicles as an anti-theft alarm triggering means.

It is contemplated that many other uses, alterations and modifications of the present invention will become apparent to those of ordinary skill in the art having read the foregoing detailed description. Accordingly, it is to be understood that this disclosure is intended to be exemplary rather than limiting and that the appended claims are to be interpreted as covering all alterations and modifications as fall within the true spirit and scope of the invention.

What is claimed is:

1. Occupant presence detecting means comprising:
    means forming an occupant sensing capacitor having a first capacitance in the presence of an occupant and a second capacitance in the absence of an occupant;
    means forming a reference capacitor having a capacitance independent of the presence or absence of an occupant;
    means for supplying charging current to said sensing capacitor and said reference capacitor;
    first, second and third terminals;
    charge detecting means responsive to a first signal applied to said first terminal and operative to simultaneously develop second signal at said second terminal which is commensurate with the capacitance of said occupant sensing capacitor and a third signal at said third terminal which is commensurate with the capacitance of said reference capacitor; and
    comparator means responsive to said second and third signals and operative to develop an output signal having a first state when the capacitances of said sensing capacitor and said reference capacitor have a first predetermined relationship, and a second state when said capacitors have a second predetermined relationship.

2. Occupant presence detecting means as recited in claim 1 wherein said charge detecting means includes a first transistor having a first electrode coupled to said occupant sensing capacitor, a second electrode coupled to said first terminal and a third electrode coupled to said second terminal, and a second transistor having a fourth electrode coupled to said reference capacitor, a fifth electrode coupled to said first terminal and a sixth electrode coupled to said third terminal.

3. Occupant presence detecting means as recited in claim 2 wherein said charge detecting means further includes a first impedance means coupled between said second terminal and circuit ground, and a second impedance means coupled between said third terminal and circuit ground, and biasing means for continuously causing biasing current to flow through and said first and second impedance means.

4. Occupant presence detecting means as rated in claim 7 wherein said occupant sensing capacitor includes a metallic electrode positioned so as to be separated from a ground plane by a volume of space in which the presence of an occupant is to be detected.

5. Occupant presence detecting means as recited in claim 4 wherein said metallic electrode and said reference capacitor are coupled to said charge detecting means by electrical conductors of substantially equal length.

* * * * *